United States Patent
Costantino

(10) Patent No.: US 8,315,760 B2
(45) Date of Patent: Nov. 20, 2012

(54) METHOD AND SYSTEM FOR RETRIEVING DIAGNOSTIC INFORMATION

(75) Inventor: David Costantino, San Diego, CA (US)

(73) Assignee: Mitchell Repair Information Company LLC, Poway, CA (US)

( * ) Notice: Subject to any disclaimer, the term of this patent is extended or adjusted under 35 U.S.C. 154(b) by 420 days.

(21) Appl. No.: 12/327,170

(22) Filed: Dec. 3, 2008

(65) Prior Publication Data

US 2010/0138701 A1 Jun. 3, 2010

(51) Int. Cl.
G01M 17/00 (2006.01)
(52) U.S. Cl. .......... 701/32.1; 701/29.1; 701/29.3; 701/31.4; 701/34.2
(58) Field of Classification Search .......... 701/29, 701/29.1–34.4; 702/183
See application file for complete search history.

(56) References Cited

U.S. PATENT DOCUMENTS

| | | | | |
|---|---|---|---|---|
| 5,541,840 A * | 7/1996 | Gurne et al. | ............. | 701/33 |
| 5,758,300 A * | 5/1998 | Abe | ............. | 455/424 |
| 5,916,286 A * | 6/1999 | Seashore et al. | ............. | 701/29 |
| 6,542,799 B2 * | 4/2003 | Mizutani et al. | ............. | 701/33 |
| 6,560,516 B1 * | 5/2003 | Baird et al. | ............. | 701/23 |
| 6,615,120 B1 * | 9/2003 | Rother | ............. | 701/33 |
| 6,714,846 B2 * | 3/2004 | Trsar et al. | ............. | 701/33 |
| 6,941,203 B2 * | 9/2005 | Chen | ............. | 701/33 |
| 6,947,816 B2 * | 9/2005 | Chen | ............. | 701/33 |
| 7,209,860 B2 * | 4/2007 | Trsar et al. | ............. | 702/183 |
| 7,319,848 B2 * | 1/2008 | Obradovich et al. | ............. | 455/99 |
| 7,444,216 B2 * | 10/2008 | Rogers et al. | ............. | 701/33 |
| 2002/0007237 A1 * | 1/2002 | Phung et al. | ............. | 701/33 |
| 2003/0167111 A1 * | 9/2003 | Kipersztok et al. | ............. | 701/29 |
| 2005/0137762 A1 * | 6/2005 | Rother | ............. | 701/29 |
| 2005/0171661 A1 * | 8/2005 | Abdel-Malek et al. | ............. | 701/33 |
| 2006/0085108 A1 * | 4/2006 | Grier et al. | ............. | 701/29 |
| 2006/0095230 A1 * | 5/2006 | Grier et al. | ............. | 702/183 |
| 2008/0004764 A1 * | 1/2008 | Chinnadurai et al. | ............. | 701/29 |
| 2009/0216401 A1 * | 8/2009 | Underdal et al. | ............. | 701/35 |
| 2009/0271066 A1 * | 10/2009 | Underdal et al. | ............. | 701/35 |
| 2009/0271239 A1 * | 10/2009 | Underdal et al. | ............. | 705/8 |

* cited by examiner

*Primary Examiner* — Darnell Jayne
*Assistant Examiner* — Patrick Hawn
(74) *Attorney, Agent, or Firm* — McDonnell Boehnen Hulbert & Berghoff LLP

(57) ABSTRACT

A system, method, and apparatus for retrieving trouble codes from an equipment under diagnosis and retrieving only relevant diagnostic information relative to the returned codes from one or more remote diagnostic libraries. An electronic diagnostic library contains diagnostic vehicle information tagged with trouble code identification ID's at a first location, and a diagnostic tool at a second location requests only relevant diagnostic information from the electronic library that is tagged with trouble code identification ID's corresponding to the retrieved trouble codes and information identifying the equipment under diagnosis. The diagnostic tool receives the specific diagnostic vehicle information at the first location and may store the specific vehicle information locally prior to displaying an index to the information to a repair technician.

32 Claims, 13 Drawing Sheets engine ◇ article-id: id=A00175279 ▭ eng-perf ◇ eng-perf-fault-isolation
doc-head ◇ ENGINE PERFORMANCE ◇ doc-head
doc-subhead ◇ Detroit Diesel - DDEC III/IV Single ECM - Troubleshooting ◇ doc-subhead 202
200

FIG. 2 info-obj: id=S10654881822005041900000 ◇ title ▭ FAULT CODE 33 - TBS HIGH ◇ title
figure ◇ graphic: graphicname=G02487850 id=S03642981992005042000000 gwidth=1col 212
210

FIG. 3 info-obj: id=S02829091362005042000000 content.type=description.and.or.operation title ⟩ Description ⟨ title para ⟩ ptxt ⟩ Fault Code 33 denotes engine Turbo Boost Sensor (TBS), see intxref: refid=S03642981992005042000000 dest=fig ⟩ Fig. 75 ⟨ intxref ⟩ and intxref: refid=S12652602292005042000000 dest=fig ⟩ Fig. 76 ⟨ intxref ⟩, input to ECM has exceeded 95% (normally more than 4.75 volts) of sensor supply voltage. ⟨ ptxt ⟩ ⟨ para ⟩ para ⟩ ptxt ⟩ Code is usually caused by: ⟨ ptxt ⟩ ⟨ para ⟩

FIG. 4

SPECIFICATIONS

| Application | Specification |
|---|---|
| Electrical Specifications | |
| Coolant Temperature Sensor Supply Voltage | Greater Than 4.75 Volts |
| Sealant Specifications | |
| Coolant Temperature Sensor | Loctite Pipe Sealant W/Teflon (PT-7260) Or Equivalent |
| Torque Specifications | |
| Coolant Temperature Sensor | 75-94 Ft. Lbs. (102-127 N.m) |

1104 — Electrical Specifications
1106 — Sealant Specifications
1108 — Torque Specifications

FIG. 14

METHOD AND SYSTEM FOR RETRIEVING DIAGNOSTIC INFORMATION

BACKGROUND

1. Field of the Application

This application relates generally to test and diagnostic systems for equipment under diagnosis, particularly motor vehicles. More specifically, the application relates to an automated process for retrieving diagnostic information relative to returned trouble codes from one or more equipment components under diagnosis. While the application is described in the context of a motor vehicle diagnostic system and method, the principles of the present application are equally applicable for any testing and diagnostic systems, including non-motor vehicle equipment, as long as the equipment under diagnosis stores trouble codes relative to a past or current error condition.

2. Description of the Related Art

Motor vehicles are becoming highly computerized products. In recent years, for example, the control of internal combustion engines has branched away from traditional mechanical linkages and analog approaches to electronic or microprocessor-based control systems. In a typical modern motor vehicle, the operation of the combustion engine is controlled by an engine control module (ECM) which receives a variety of input signals and outputs signals for monitoring and controlling various components of the engine. For example, the ECM can send signals to a fuel system for controlling the air/fuel mix sent to the engine cylinders. The ECM may also receive and store signals from various sensors throughout the engine, drive train, braking system, exhaust system, heating and cooling systems, and braking systems. For example, the sensors may provide signals indicative of engine speed, fuel/air mix, intake and exhaust pressure, engine operating temperatures, fluid levels, activation of anti-lock brakes (ABS), and the like that may be monitored and/or stored by the ECM.

The ECM may retain a portion of the data in memory as historical data, providing a detailed history of equipment performance, operating parameters, and error indicators. An external interface to the ECM and its stored data is provided at a location accessible to a repair technician. The information stored in the ECM can be downloaded via the external interface at predetermined intervals in the equipment life, when there are noticeable degradations in equipment performance, or when critical trouble codes are received and externally indicated to an operator of the equipment. The downloaded information can then be analyzed by a repair technician to evaluate the equipment performance or error conditions, and thereby make informed recommendations for servicing of the equipment.

In order to facilitate the retrieval of trouble codes and diagnostic information from an ECM or similar circuit, a number of different types of trouble code retrieval tools have been developed to assist in the diagnosis and repair of fault conditions reported by the ECM's and other similar circuits. Such a retrieval tool can typically be connected to the ECM's external interface and may provide the data, via a wired or wireless connection, to a diagnostic tool for displaying the data stored in the ECM visually to the repair technician, or for furthering processing. For example, a retrieval tool may obtain one or more pieces of information about the vehicle's engine noted above, including fluid levels, operating temperatures, fuel/air mixes, in addition to other information reported by the transmission, air conditioning, braking, and/or power systems.

Once the error codes are retrieved, a repair technician must determine a course of action to further diagnose a problem represented by the one or more trouble codes and/or repair the underlying problem represented by the one or more trouble codes.

Manufacturers typically publish repair manuals, including diagnostic trees, exploded part diagrams, and the like, to aid the repair technician in the diagnosis and repair of problems associated with the retrieved trouble code(s). Repair manuals are normally published separately for each piece of equipment. For example, based upon selected faults, a published diagnostic tree for a particular motor vehicle engine model could present the reader with a list of tests to be performed to diagnose the cause or causes of the faults particular to that model. The tests can be listed in the order in which they would most likely be effective in diagnosing the faults, based upon a manufacturer's information and previous repair and diagnosis experience with this type of equipment, for example. The repair manuals may be available in hard copy or accessible via the Internet in a computer viewable format.

In practice, a repair technician then navigates through the repair information in order to find the information pertinent to the specific equipment being diagnosed. Though technicians normally see this activity as a part of their job, it can be a time consuming process. The time element increases a cost of repair and delays the turnaround time for returning the motor vehicle under repair to service. This is especially important in the trucking industry, where a truck must be on the road to be generating income, or where a disabled truck is carrying a time-sensitive load such as perishable food.

SUMMARY

In light of the above, a method for quickly and automatically retrieving only relevant diagnostic vehicle information corresponding to retrieved trouble codes from an ECM is desirable.

According to the present application, a method, system, and apparatus for quickly and automatically retrieving relevant diagnostic repair content is provided. The method, system, and apparatus includes receiving trouble codes from a equipment under diagnosis, retrieving identification information such as make, model, and year or a unique Equipment Identification Number (EIN) of the equipment under diagnosis, generating and sending a request for diagnostic information to a remote computer containing a database of article and repair information, receiving only relevant diagnostic information (including text and/or images) for evaluating, repairing, or replacing the malfunctioning equipment associated with the trouble codes, and displaying an index to the received data to a repair technician for use in evaluating, repairing, or replacing the malfunctioning equipment.

In another aspect, the method, system, and apparatus includes storing an electronic library of diagnostic and repair information tagged with article and repair information identification codes in order to allow for the retrieval of only the diagnostic information relevant to the particular trouble codes received, including receiving a request for diagnostic information relevant to one or more trouble codes and a particular make, model, and year or EIN of equipment under diagnosis, cross-referencing the trouble codes and make, model, and year or EIN to identify only the repair information identification codes relevant to the received trouble code, and responding to the request with only the repair information relevant to repairing the equipment fault associated with the trouble codes.

In still another aspect, the method, system, and apparatus includes receiving trouble codes from equipment under diagnosis at a first location, retrieving identification information such as make, model, and year or EIN of the equipment under diagnosis, generating and sending a request for diagnostic information to a remote computer containing a database of repair information, receiving the request for diagnostic information at a second remote computing location, cross-referencing the trouble codes and make, model and year or EIN to identify repair information identification codes relevant to the received trouble code, responding to the request with only the repair information relevant to repairing an equipment fault associated with the trouble codes, receiving only the relevant repair information associated with the trouble codes at the first location, and displaying an index to the received data to a repair technician at the first location for use in evaluating, repairing, or replacing the malfunctioning equipment.

As a result of the forgoing, all relevant diagnostic and repair information corresponding to received trouble codes from equipment under diagnosis can be retrieved in a short period of time and displayed in index form for use by a repair technician. By providing tagged repair information data at the diagnostic information portal side, a diagnostic tool can retrieve all relevant repair information quickly and at one time, storing the information locally and allowing for a quicker diagnosis and repair of the equipment under diagnosis. As a result, repair stations can become more efficient, potentially increasing turn-around times and increasing profits for both the repair technician and the owner of the vehicle under test. Additionally, in the event the server-side diagnosis information database becomes unavailable, a locally stored copy of the repair information can prevent the loss of further downtime in repairing the vehicle under test because of the lack of access to the remote diagnostic repair information. Finally, by tagging diagnostic repair information based on possible trouble codes received and stored in equipment under diagnosis, a processing load on the diagnostic repair information database will be substantially decreased, as only relevant information is provided to the diagnostic tool, and non-relevant data is not provided to the diagnostic tool.

These as well as other features, advantages and alternatives will become apparent to those of ordinary skill in the art by reading the following detailed description, with appropriate reference to the accompanying drawings.

BRIEF DESCRIPTION OF FIGURES

FIG. 2 is a portion of tagged repair data illustrating an Article ID tag for a particular example engine that can be utilized by the system of FIG. 1.

FIG. 3 is a portion of tagged repair data illustrating an Information ID tag for a particular trouble code for a particular example engine that can be utilized by the system of FIG. 1.

FIG. 4 is a portion of tagged repair data illustrating a Description ID tag for a particular trouble code for a particular example engine that can be utilized by the system of FIG. 1.

FIG. 14 is an example of a display of Specifications tagged diagnosis information displayed to a repair technician.

DETAILED DESCRIPTION OF EXEMPLARY EMBODIMENTS

I. Overview of the Diagnostic System Architecture

Figure 1:
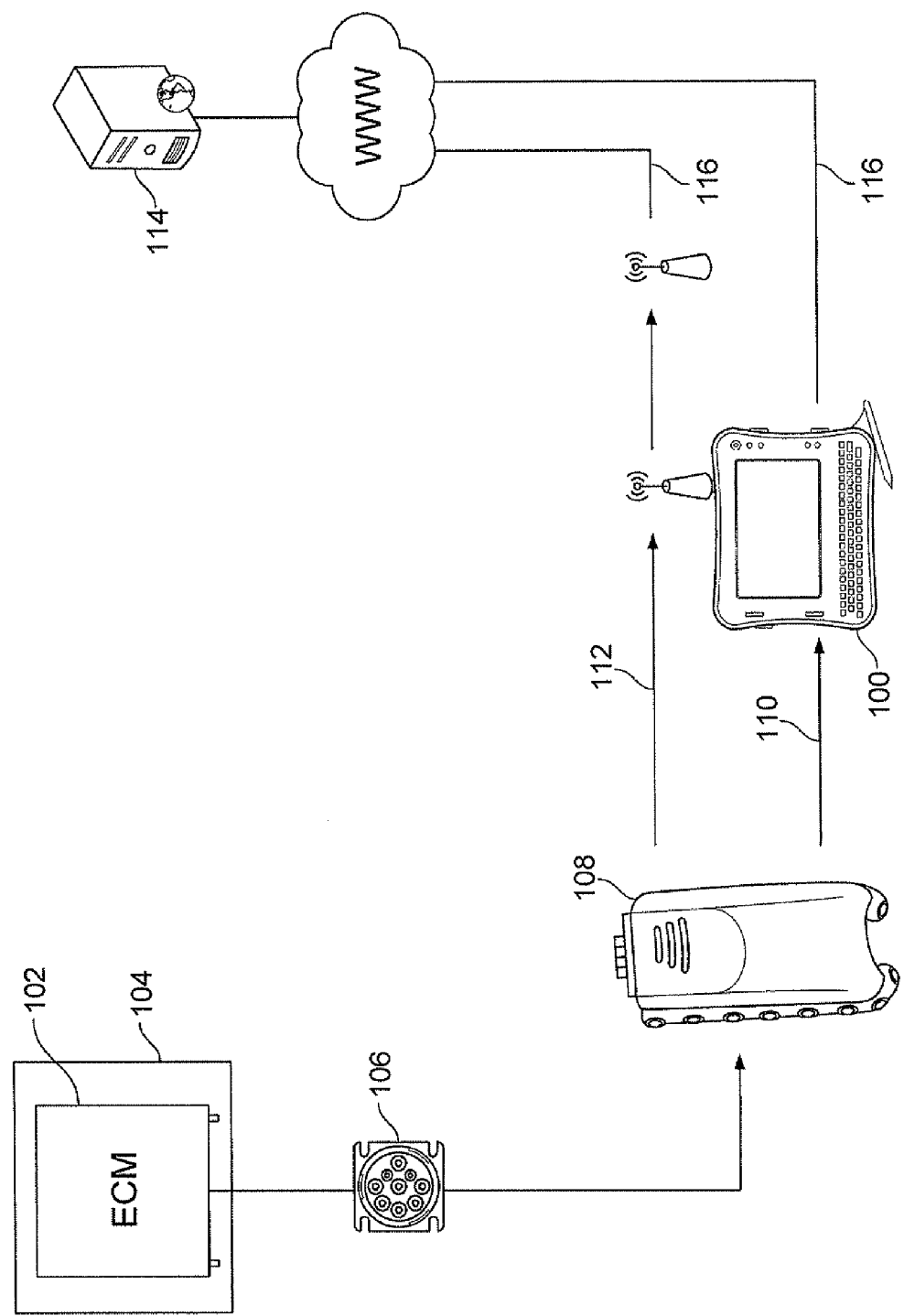
FIG. 1 is a block diagram illustrating a high-level view of the trouble code module (ECM), diagnostic tool, and diagnostic information portal for providing relevant diagnostic information to the diagnostic tool.

FIG. 1 is a block diagram of an exemplary system using a diagnostic information portal to provide only relevant diagnostic information to a requesting diagnostic tool. As illustrated, a diagnostic tool 100 interfaces with an Engine Control Module (ECM) 102 or other similar circuit contained within a vehicle 104 via a vehicle interface port 106 and PC-to-vehicle interface 108. Although an ECM is a standardized control module and is illustrated in FIG. 1, any type of electronic error reporting and storage device could be used. The motor vehicle 104 may be a passenger car, a light duty truck, a tractor-trailer truck, or any other type of motor vehicle or general electro-mechanical system. Additionally, the disclosure of a motor vehicle 104 in FIG. 1 is exemplary in nature only, and equipment under diagnosis could be any electro-mechanical device. As set forth in FIG. 1, the diagnostic tool 100 may communicate with the PC-to-vehicle interface device 108 through a wired connection 110 or a wireless connection 112.

The PC-to-vehicle interface device 108 is a standard interface device well known in the industry for providing standardized access to vehicle ECM modules across a multitude of different protocols. For example, the Nexiq® USB-Link (Product No. 125032) may be used to provide an interface between the diagnostic tool 100 and the vehicle ECM device 102.

The diagnostic tool 100 interfaces with the vehicle 104 to collect diagnostic information about the vehicle 104. The diagnostic tool 100 may interface with one or more systems within the vehicle 104 to obtain diagnostic information about those systems. For example, the diagnostic tool 100 might obtain information about the vehicle's engine, transmission system, electrical systems, air conditioning system, braking system, power steering system or any other systems. The diagnostic tool 100 might interface directly with these various systems, or the diagnostic tool 100 might interface with other diagnostic equipment (not shown), which in turn interfaces with various systems or components in the vehicle 104. Other configurations are also possible.

Depending on the motor vehicle 104 and the particular configuration of the diagnostic tool 100 or other equipment, the diagnostic tool 100 may obtain stored trouble code information about the various systems in the motor vehicle 104 automatically upon being connected to the vehicle 104 or upon an appropriate prompt to a repair technician utilizing the diagnostic tool 100. An automated process advantageously allows a repair technician to quickly and efficiently obtain diagnostic information about various systems in the motor vehicle 104. The trouble codes retrieved may be historical in nature (for example, indicating that the Anti-lock Braking System was engaged recently), or may reflect a current status of the vehicle (for example, coolant fluid levels are low).

The repair technician might also manually direct the diagnostic tool 100, via the Engine Control Module, to perform various tests on the motor vehicle 104 or to acquire certain other diagnostic information about the motor vehicle 104. This might be in addition to or in place of the previously described automated diagnostic information collection methods. Thus, the diagnostic tool 100 might automatically collect predetermined data, might collect additional data as directed by the repair technician, or might perform a combination of these methods to acquire the diagnostic information.

The trouble code(s) provided by the Engine Control Module are normally very limited in descriptive ability, but may provide a short description of an error flag, such as "128-175-2: Oil Temperature erratic." A repair technician working on a complex engine would likely not be able to formulate a diagnosis or repair plan without substantial further exploration and test of the engine under diagnosis, even in light of the received trouble code(s).

Once the diagnostic tool 100 acquires at least the trouble code information from the motor vehicle 104, plus any additional information if available, the diagnostic tool 100 may then formulate a request to a diagnostic information portal 114. The diagnostic information portal 114 can provide a centralized location for repair technicians to obtain possible causes of problems with their motor vehicles, obtain diagrammed testing steps, specifications, illustrated repair and removal instructions, and other useful information relative to the trouble codes. The diagnostic information portal 114 can be located at the repair technician's worksite or may be located at a more remote location and might then be accessed via a wide area network or via the Internet. In either case, the diagnostic information portal 114 is likely to be accessed simultaneously by more than one repair technician. Thus the diagnostic information portal 114 might communicate with multiple diagnostic tools 100, although FIG. 1 illustrates only a single such device.

While FIG. 1 illustrates only a single diagnostic information portal 114, a diagnostic information system might include more than one diagnostic information portal 114. Each diagnostic information portal 114 in the system might communicate one or more pieces of information relative to the retrieved trouble codes, or may simply perform a load balancing function between a cluster of servers constituting a single diagnostic information portal 114. Thus, it should be understood that the configurations described herein are merely exemplary in nature, and many alternative configurations might also be used.

The diagnostic tool 100 communicates with the diagnostic information portal 114 over a communication link 116. The communication link 116 may be a wired link or a wireless link, or a combination thereof. A wireless communication link 116 can use a variety of different wireless protocols, such as the protocols under the Institute of Electrical and Electronics Engineers ("IEEE") 802.11 umbrella, IEEE 802.16, IEEE 802.20, Bluetooth, code division multiple access ("CDMA"), frequency division multiple access ("FDMA"), time division multiple access ("TDMA"), Global System for Mobile Communications/General Packet Radio Service ("GSM/GPRS"), infrared, or others. Furthermore, the data may be accessible via the internet using one or more network protocols supported by a TCP network, including but not limited to: HTTP, FTP, or SSH.

In formulating a request to the diagnostic information portal 114, the diagnostic tool 100 might include the diagnostic information received from the vehicle 104. Alternatively, the diagnostic tool 100 might only include part of the diagnostic information received from the vehicle 104, such as those trouble codes most directly related to the problem or modification or those most likely to resolve the underlying problem. The request will also include information about the make, model, year, the vehicle identification number (VIN), or any other uniquely identifying information for the motor vehicle 104 itself, from which unique part model information may be derived, or if available, information about the make, model, year, or unique equipment identification number (EIN) of one or more sub-parts of the motor vehicle under diagnosis. For example, the ECM may contain make, model, and year or EIN information about the motor vehicle's engine, which could be provided directly to the diagnostic tool 100. The EIN for the engine may be duplicated for engines of the same make, model, and year, or may be unique to every engine but include make, model, and year information embedded therein. The request to the diagnostic information portal 114 might also include additional information entered by the repair technician.

The diagnostic information portal 114 receives the request from the diagnostic tool 100. In response, the diagnostic information portal 114 uses the diagnostic information in the request to search its database of diagnostic information to determine what relevant diagnostic information should be provided in response to the request. The diagnostic information database in the portal 114 will include tagged electronic diagnostic documents such as those set forth in FIGS. 2-4. After only relevant repair data is located, the diagnostic information portal 114 will respond to the request with the relevant repair data (including text and/or images). Upon receipt, the diagnostic tool 100 can display an index into the relevant repair data via a display.

II. Exemplary Diagnostic Information Portal Architecture

The diagnostic information portal 114 may be a mainframe computer, a blade server, a desktop machine, or any other computing system capable of responding to network requests and storing a database of diagnostic information. The portal 114 preferably includes random access memory for holding program code and data, a processor for processing program instructions, and a permanent data store for storing a diagnostic information database. The database may be comprised of tagged text that is searchable include graphic images setting forth repair and diagnostic information usable by a repair technician.

FIG. 2 shows the beginning of an example of a tagged diagnostic repair article for a "Detroit Diesel-DDEC III/IV Single ECM" engine 200. The tagging set forth in FIG. 2 and in FIGS. 3 and 4 is based on the Standard Generalize Markup Language (SGML). SGML is an ISO 8879:1986 standard meta-language in which one can define markup languages for documents. Although FIGS. 2-4 utilize SGML, any document markup language could be utilized, including, for example, HTML or XML.

As shown in FIG. 2, an SGML document is tagged with an Article ID that identifies a document describing all trouble codes associated with a particular engine. The Article ID given to the document in FIG. 2 is set forth in an "article-id" tag with the value of "A00175279" 202. Although an exemplary ASCII article-id tag is set forth in FIG. 2, any unique tagging system could be used. All trouble codes related to the Detroit Diesel-DDEC III/IV Single ECM engine 200 will be set forth in this document stored on the diagnostic information portal 114. FIG. 3 sets forth another portion of the article-id "A00175279" 202 that begins to disclose information related to "Trouble code 33" 210 on a Detroit Diesel-DDEC III/IV Single ECM" engine 200. The portion of the article ID "A00175279" 202 setting forth diagnosis information relative to "Trouble code 33" 210 is given its own information object ID, here "S106548818220050419000000" 212. Although an exemplary ASCII information object id tag is set forth in FIG. 3, any unique tagging system could be used. As set forth in FIG. 3, the trouble code 33 means that the Turbo Boost Sensor (TBS) is too high. FIG. 4 sets forth another portion of the article ID "A00175279" 202 including a detailed description 220 of Fault Code 33, cross-references to other graphics and text for describing the fault, and finally begins to set forth the most common causes of Fault Code 33. The detailed description 220 of Fault Code 33 is given a unique information object ID of "S028290913620050420000000" 222.

By organizing diagnostic repair documents in a database by equipment types and fault codes, and tagging the information with unique Article and Object ID's, the diagnostic information portal 114 can respond to a request by the diagnostic tool 100 with only those portions of the repair information that are relevant to the specific trouble codes provided by the diagnostic tool 100 in a quick and efficient manner. In the example set forth in FIG. 2, a VIN number of a motor vehicle 104 under diagnosis would be used to determine the make, model, and year or a unique equipment identification number for the engine utilized in the motor vehicle. This could be accomplished, for example, via a look-up table or request to an API server that would provide a conversion between a VIN number and the standard equipment contained a vehicle associated with the VIN number. In the example above, a cross-reference of the VIN number retrieved from the motor vehicle 104 would return a unique Equipment Identification Number (EIN) representing a Detroit Diesel-DDEC III/IV Single ECM engine 200. Alternatively, a unique EIN representing a Detroit Diesel-DDEC III/TV Single ECM engine 200 could have been retrieved directly from the ECM of the motor vehicle if it was available.

The format of the information provided to the diagnostic tool 100 allows the tool to locally store the information. The diagnostic tool 100 can in turn display the diagnostic and repair information in a logical manner to a repair technician. Ultimately, this may aid the repair technician in more quickly diagnosing and fixing the problem with the vehicle 104 represented by the trouble codes retrieved from the ECM 102.

III. Exemplary Diagnostic Tool Architecture

The diagnostic tool 100 may be various types of devices used by a repair technician. For example, the diagnostic tool 100 may comprise a personal digital assistant (PDA) or other handheld device. Alternatively, the diagnostic tool 100 may comprise a desktop computer, a laptop computer or some other type of diagnostic equipment. One example of a diagnostic tool includes a vehicle analyzer system, such as the engine analyzer system disclosed in U.S. Pat. No. 5,250,935, which is herein incorporated in its entirety by reference, as if fully set forth in this description. As set forth in FIG. 1, the diagnostic tool 100 may communicate with the PC-to-vehicle interface 108 through a wired connection 110 or a wireless connection 112, and may communicate with the diagnostic information portal 114 via a wired or wireless connection 116. The operation of the diagnostic tool may be effected by a software or firmware code stored in a non-volatile data store and executed via a general purpose processor transformed by the software or firmware code into a specific purpose processor, or may be effected solely by a hardware structure, or a combination of the two.

IV. Exemplary Operation of the Relevant Diagnostic Information Retrieval Method

Figure 5:
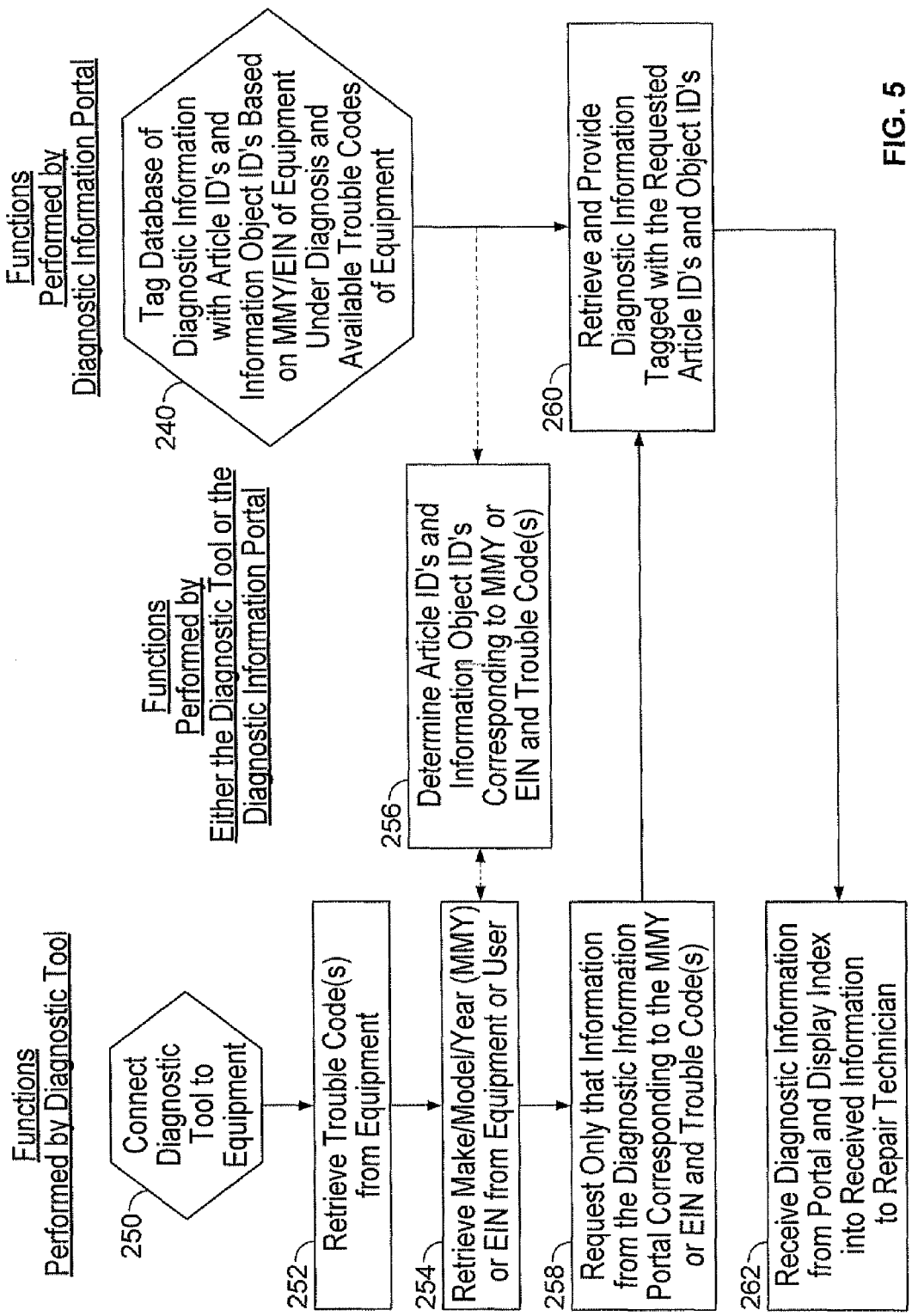
FIG. 5 is a flow-chart showing one example of operation of the system of FIG. 1.

FIG. 5 sets forth one example of the operation of the diagnostic tool 100 while the tool is connected to an ECM 102 contained within a vehicle 104. In step 240, the diagnostic information portal 114 tags a database of diagnostic information with Article ID's and Information Object ID's based on a make/model/year or EIN and trouble codes of a plurality of different equipment, such as engines. The step 240 need only be executed once, or may be executed upon any addition of new documents to the database or upon an update to documents already in the database. In step 250, the diagnostic tool is connected to equipment under diagnosis, for example a motor vehicle 104, by a repair technician. In step 252, the diagnostic tool either automatically or manually, upon the action of the repair technician, retrieves trouble code(s) from the motor vehicle 104. The tool 100 then retrieves a make/model/year (MMY) or EIN information from the vehicle, or requests entry of the same information by the repair technician in step 254. The EIN retrieved may be a vehicle identification number (VIN), in which case make, model, year or EIN of specific sub-parts of the motor vehicle 104 must be determined, or may be unique EIN's of the specific sub-parts, if available. The tool 100 may then identify which Article ID's and Information Object ID's are relevant to the trouble code(s) and MMY or EIN in step 256 if it is capable of doing so. Alternately, the identification of Article ID's and Information Object ID's may be accomplished by the diagnostic information portal in a later step.

In step 258, the diagnostic tool 100 requests only that information from the diagnostic information portal 114 that corresponds to the trouble codes and MMY or EIN. The content of the request may include the MMY, EIN, and/or trouble codes retrieved in steps 252 and 254, or may include the Article ID's and Information Object ID's generated in step 256. In step 260, the diagnostic information portal 114 receives the request from the diagnostic tool 100, and if necessary, identifies Article ID's and Information Object ID's in step 256, and sends only the specific diagnostic information corresponding to the MMY or EIN and trouble code(s) to the diagnostic tool 100. In step 262, the diagnostic tool 100 receives the specific diagnostic information from the diagnostic information portal and displays an index into the data to the repair technician. Each of these steps will be explained in more detail below, as an exemplary execution of a diagnostic tool display is illustrated in diagnosing trouble codes related to engine equipment of a motor vehicle 104.

Figure 6:
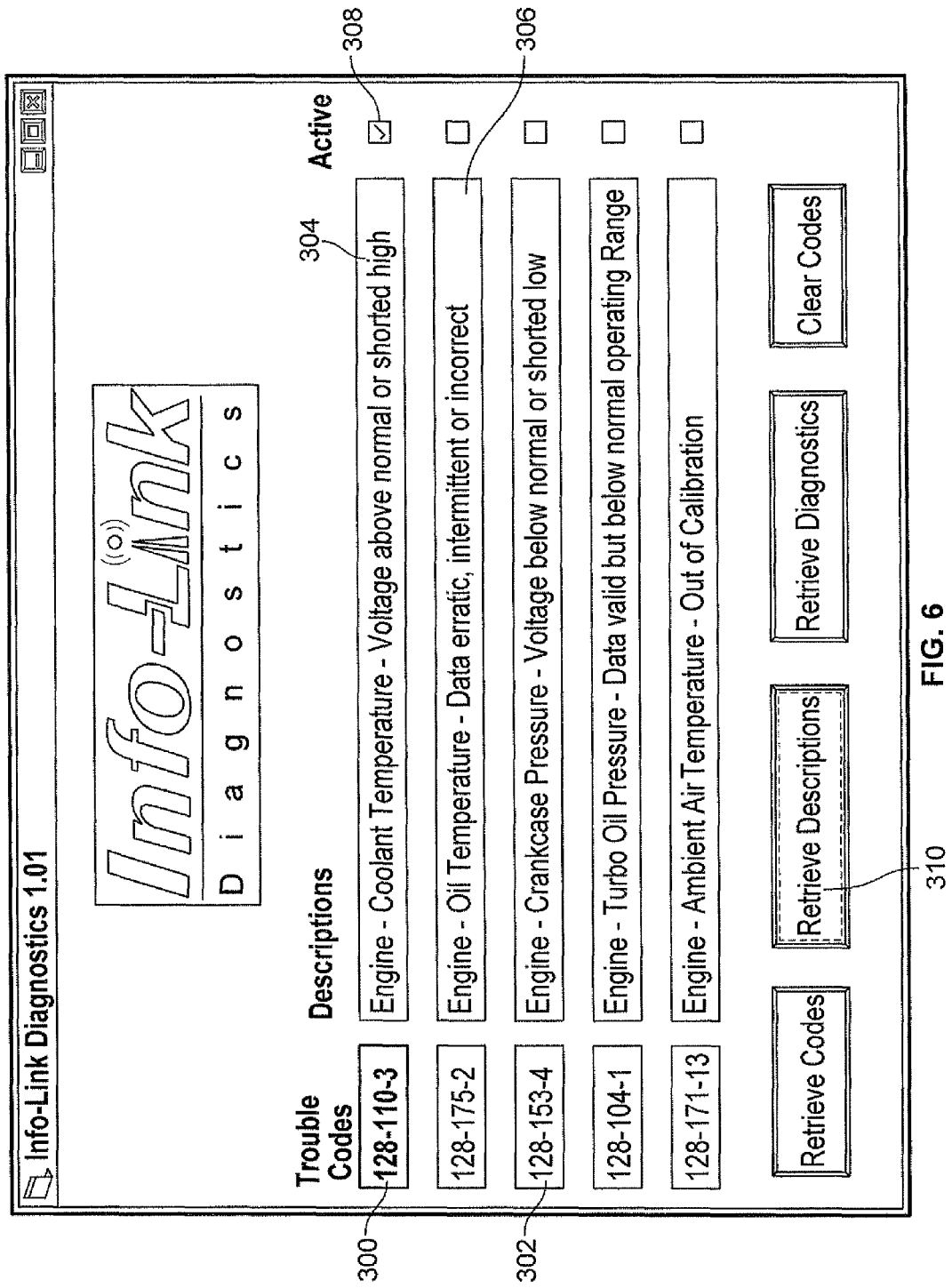
FIG. 6 is an example of a display screen on a diagnostic tool prior to retrieving diagnostic repair information.

FIG. 6 sets forth an example of an initial display of a diagnostic tool 100 upon power up. As shown, the diagnostic tool 100 can retrieve the trouble codes 300 from the ECM 102 and populate the trouble code fields 302 with the trouble codes 300 for display to the repair technician. The diagnostic tool 100 can also display short summaries 304 of the meaning of the trouble codes 300, if available. These short summaries 304 may be decoded from the ECM or stored in the diagnostic tool 100. If no short summary is available, the descriptions box 306 for that trouble code may be left blank.

Once all of the trouble codes 300 are retrieved, the diagnostic tool will attempt to list the trouble codes in an order in which they would be most likely to solve the underlying problem in the motor vehicle 104. The checkboxes 308 indicate currently 'active' trouble codes by placing a check in appropriate checkboxes 308 to indicate an error currently being experienced in the equipment. The absence of a checkbox 308 adjacent a particular checkbox indicates that the trouble code is historical in nature, i.e., that it was asserted at some point in the past, but is not currently being asserted.

After populating the initial display of the diagnostic tool 100, the repair technician may click on the retrieve descriptions button 310 to cause the diagnostic tool 100 to send a request for diagnostic information from the diagnostic information portal 114 regarding the top-most trouble code, the trouble code that is most likely to solve the underlying problem in the motor vehicle 104. As noted above, the data included in the request may include one or more trouble codes 300, one or more make/model/year or EIN information regarding the motor vehicle or equipment under repair, and optionally any additional information provided by the repair technician. In this example, the diagnostic tool will have retrieved a VIN of the motor vehicle or a unique EIN of the engine equipment relating to the retrieved trouble codes 300. If only the VIN is available, the diagnostic tool 100 will utilize a look up table or API function call, for example, to retrieve one or more unique EIN's of the engine equipment relating to the retrieved trouble codes 300.

The diagnostic tool 100 or the diagnostic information portal 114 may execute a cross-reference process in which trouble codes 300 and make/model/year or EIN information is transformed into Article ID's and Information Object ID's that contain diagnosis and repair information related to the provided trouble codes 300 prior to sending the request to the diagnostic information portal 114. If the conversion process is executed at the diagnostic tool 100, then only the relevant Article ID's and Information Object ID's are provided to the diagnostic information portal 114, and trouble codes 300 are not included in the request. If the conversion process is executed at the diagnostic information portal 114, the trouble codes 300 and MMY or EIN information must be sent in the request to the diagnostic information portal 114.

After conversion of the request to Article ID's and Information Object ID's, the diagnostic repair information portal 114 searches its database to retrieve only the diagnostic information necessary for repairing the malfunctioning portions of the equipment indicated by the MMY or EIN information and trouble codes 300. Only the relevant diagnostic information is then sent back to the diagnostic tool 100, which either stores the information locally, displays it to the repair technician, or both.

Figure 7:
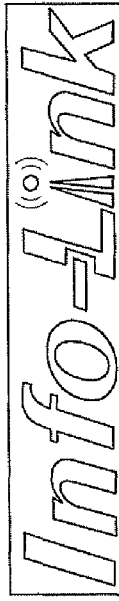
FIG. 7 is an example of an index into received diagnostic repair information displayed after the diagnostic tool retrieves diagnosis information from the diagnosis information portal.

FIG. 7 sets forth an exemplary index display on the diagnostic tool 100 of diagnostic information retrieved from the diagnostic information portal 114. The trouble code 300 utilized in the current search is set forth in the trouble code Summary Box 400. At the bottom of the window, a Vehicle Summary Box 402 including the make, model, year, vehicle identification number (VIN), and type of engine included in the motor vehicle 104 is set forth. The Vehicle Summary Box 402 may be expanded to include additional information, such as the EIN of the engine, or any other information relevant to diagnosis.

The remaining buttons, with the exception of the "Clear Codes" button 404, provide for expanded display of diagnostic information retrieved from the diagnostic information portal 114. The Code Description button 406 displays an expanded description of the trouble code 300 set forth in the trouble code Summary Box 400, including the most likely cause(s) of the trouble code 300. The Wiring Diagram button 408 displays graphical wiring diagrams (if any) related to the trouble code 300 set forth in the trouble code Summary Box 400. The Connector Views button 410 displays graphical views of Connectors (if any) related to the trouble code 300 set forth in the trouble code Summary Box 400. The Component Locator button 412 displays graphical views of the area around where a component is located to aid the repair technician in finding the component and repairing or replacing it. The Testing Steps button 414 displays a number of steps to tale in diagnosing the trouble code 300 set forth in the trouble code Summary Box 400. The Removal & Installation button 416 displays a number of steps to tale to remove and/or replace a component in diagnosing the trouble code 300 set forth in the trouble code Summary Box 400. The Specifications button 418 displays specifications (such as temperature limits, pressure limits, etc.) of parts involved in the diagnosis and repair of parts related to the trouble code 300 set forth in the trouble code Summary Box 400. The Clear Codes button 404 mentioned above removes all of the information from the trouble code Summary Box 400 and the Vehicle Summary Box 402, and requires that the repair technician begin a new search with a new trouble code 300.

Figure 8:
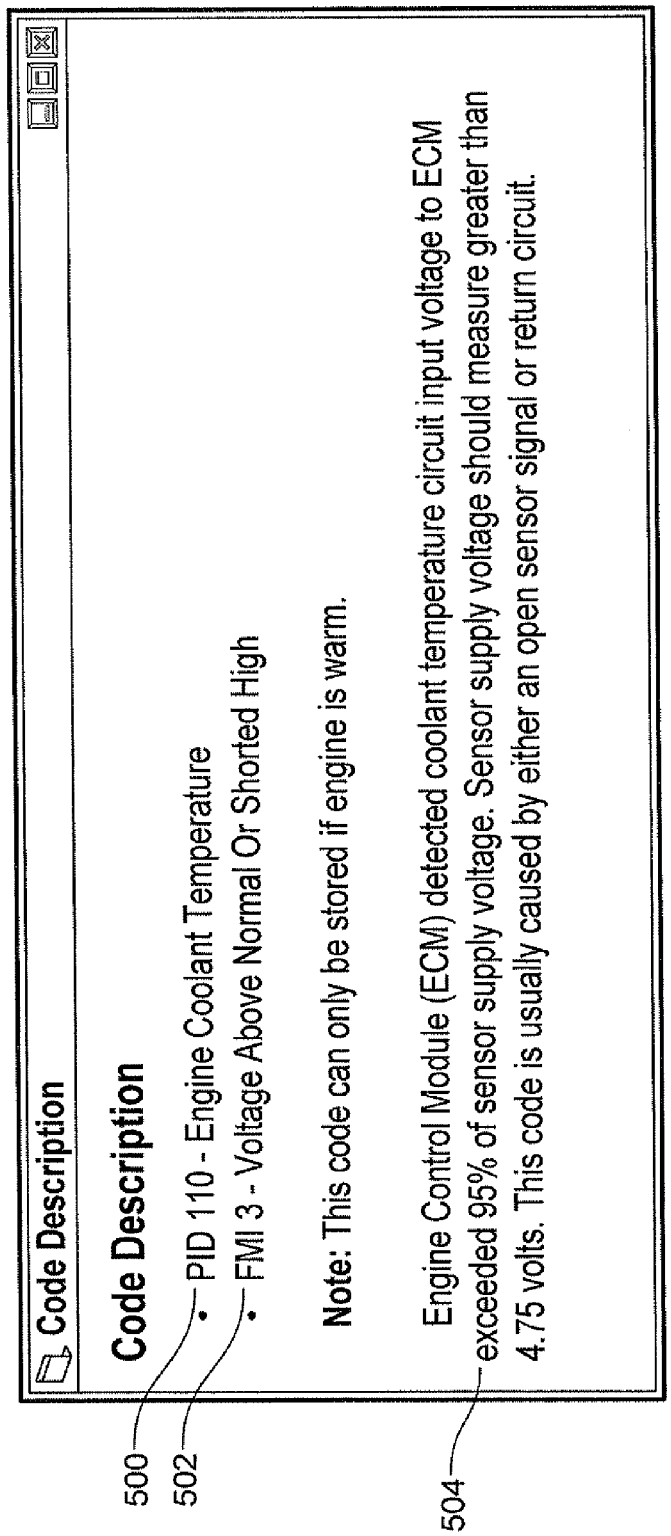
FIG. 8 is an example of a display of Code Description tagged diagnosis information displayed to a repair technician.

An example of a display of a Code Description is set forth in FIG. 8. As shown in this figure, the description at the top of the display sets forth the particular parameter identifier (PID) 500 and failure mode identifier (FMI) 502. The Code Description box also includes an expanded summary 504 of the meaning of the trouble code 300.

Figure 9:
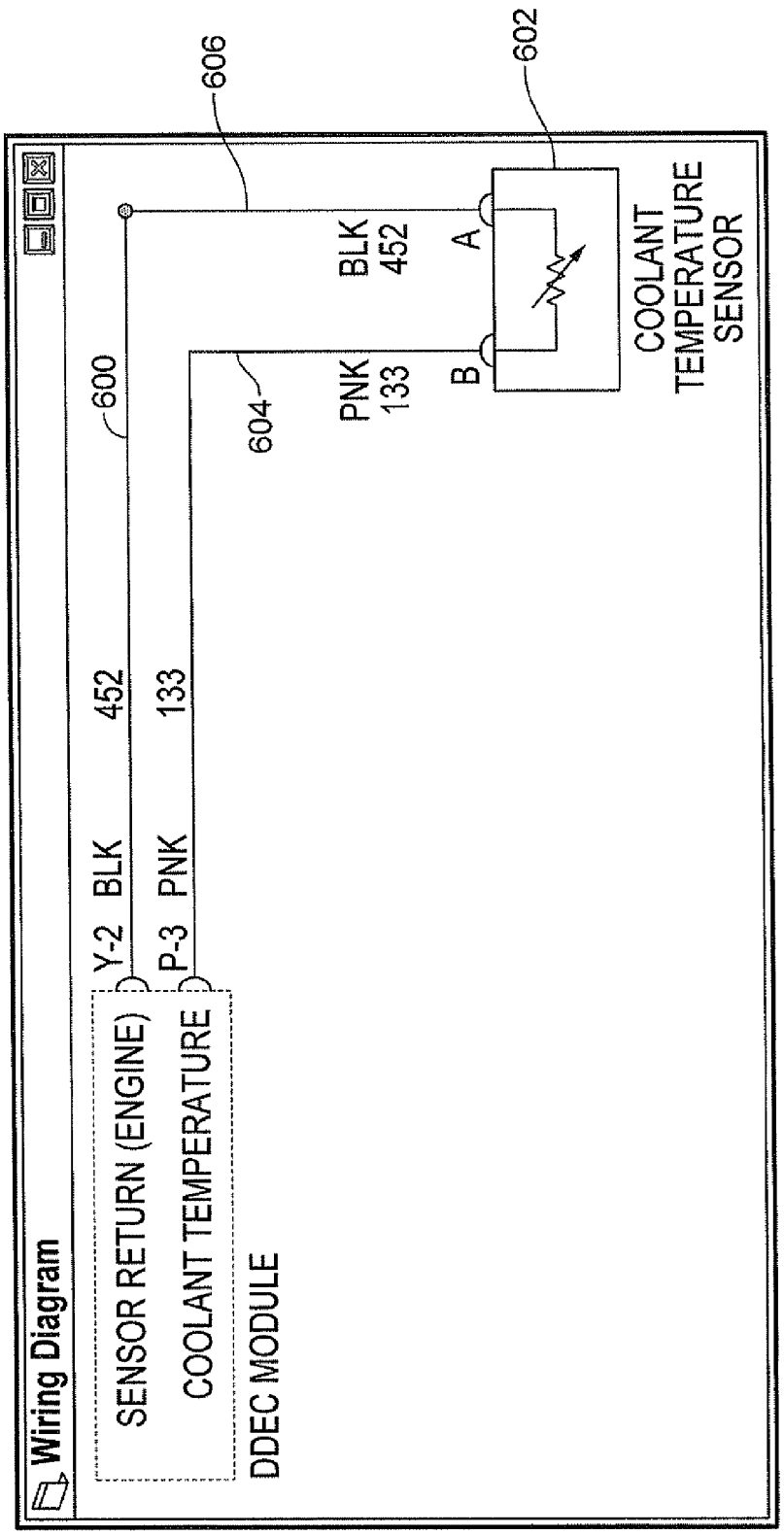
FIG. 9 is an example of a display of Wiring Diagram tagged diagnosis information displayed to a repair technician.

An example of a display of a Wiring Diagram is set forth in FIG. 9. As shown in this figure, the Wiring Diagram sets forth a wiring layout 600 for the component under test (here, a coolant temperature sensor 602). The Wiring Diagram display also sets forth colors for each of the wires connecting the component 602 (here, a pink wire 604 and a black wire 606).

Figure 10:
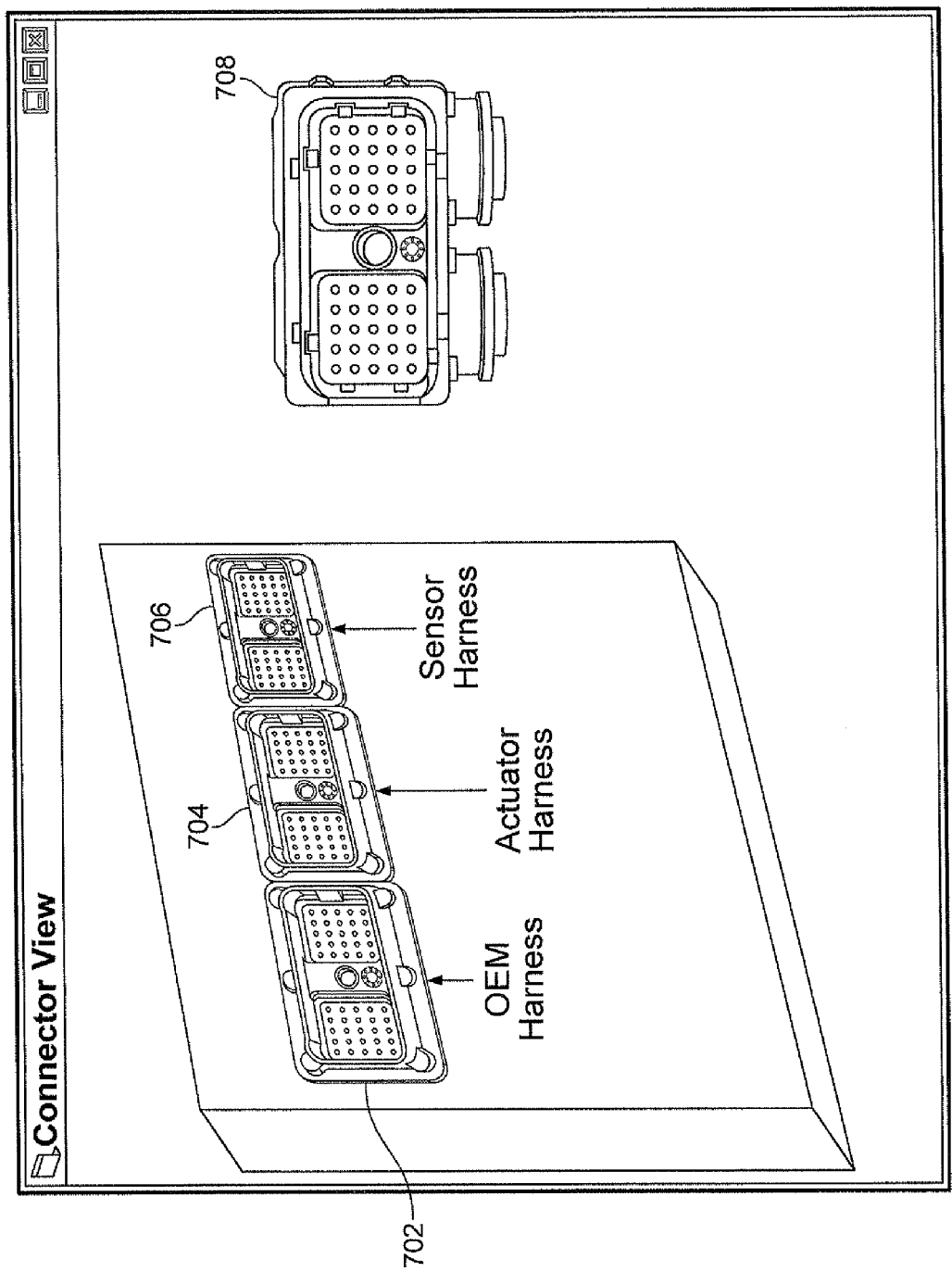
FIG. 10 is an example of a display of Connector View tagged diagnosis information displayed to a repair technician.

An example of a display of a Connector Views is set forth in FIG. 10. As shown in this figure, the Connector View sets forth several connectors involved in the repair or replacement of the coolant temperature sensor 602, including a schematic view of the OEM Harness 702 connector, a schematic view of the Actuator Harness 704 connector, a schematic view of the Sensor Harness 706 connector, and finally a photograph of an actual harness connector 708 for ease of identification.

Figure 11:
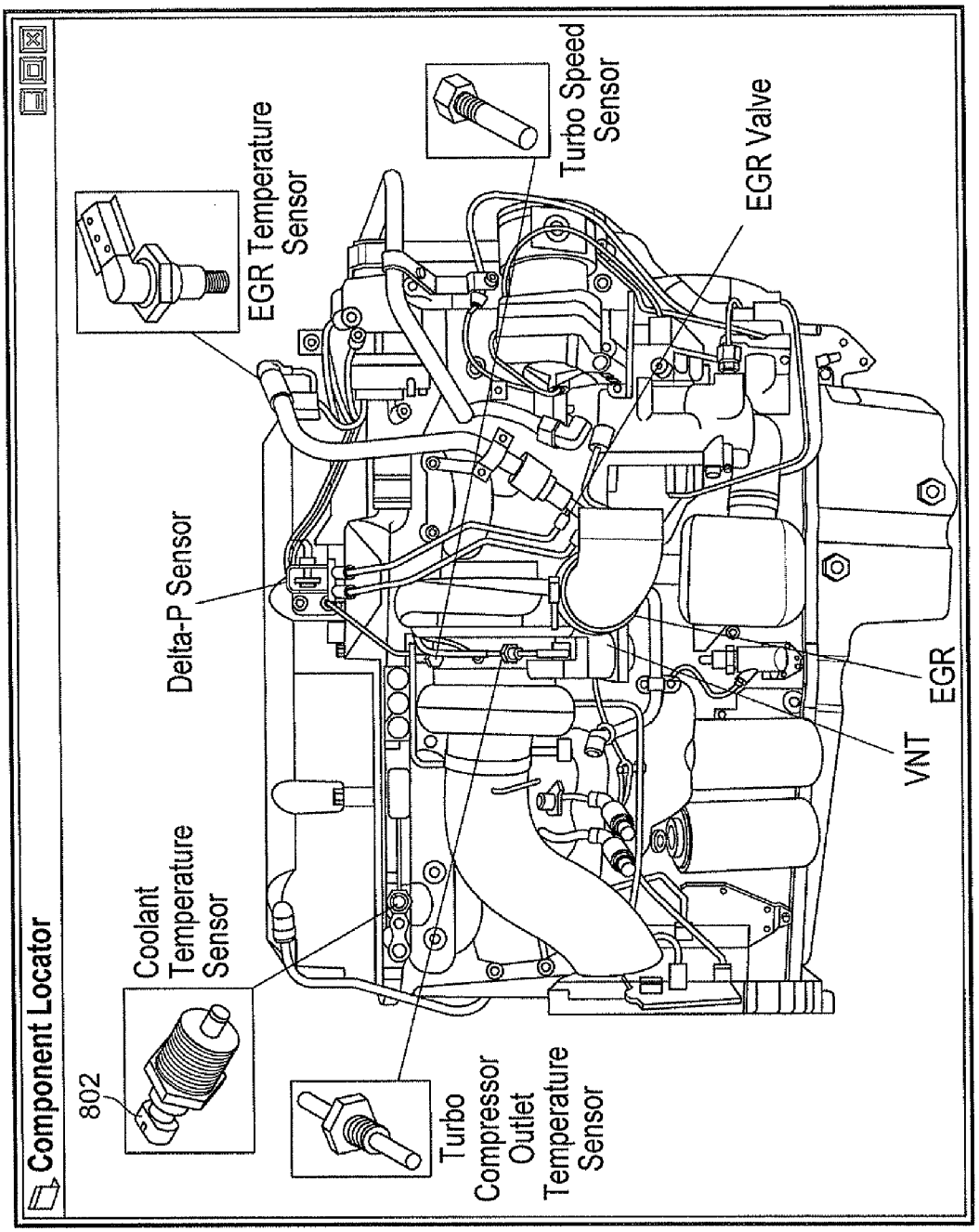
FIG. 11 is an example of a display of Component Locator tagged diagnosis information displayed to a repair technician.

An example of a display of a Component Locator is set forth in FIG. 11. As shown in this figure, the Component Locator display sets forth a general area surrounding the placement of the part to be replaced (here again, the coolant temperature sensor 802). The Component Locator display of FIG. 10 allows the repair technician to view a portrayal of an entire piece of equipment (here, an actual engine) with annotated locations of parts, making it very easy for the repair technician to locate the part needing to be repaired or replaced on the equipment.

Figure 12:
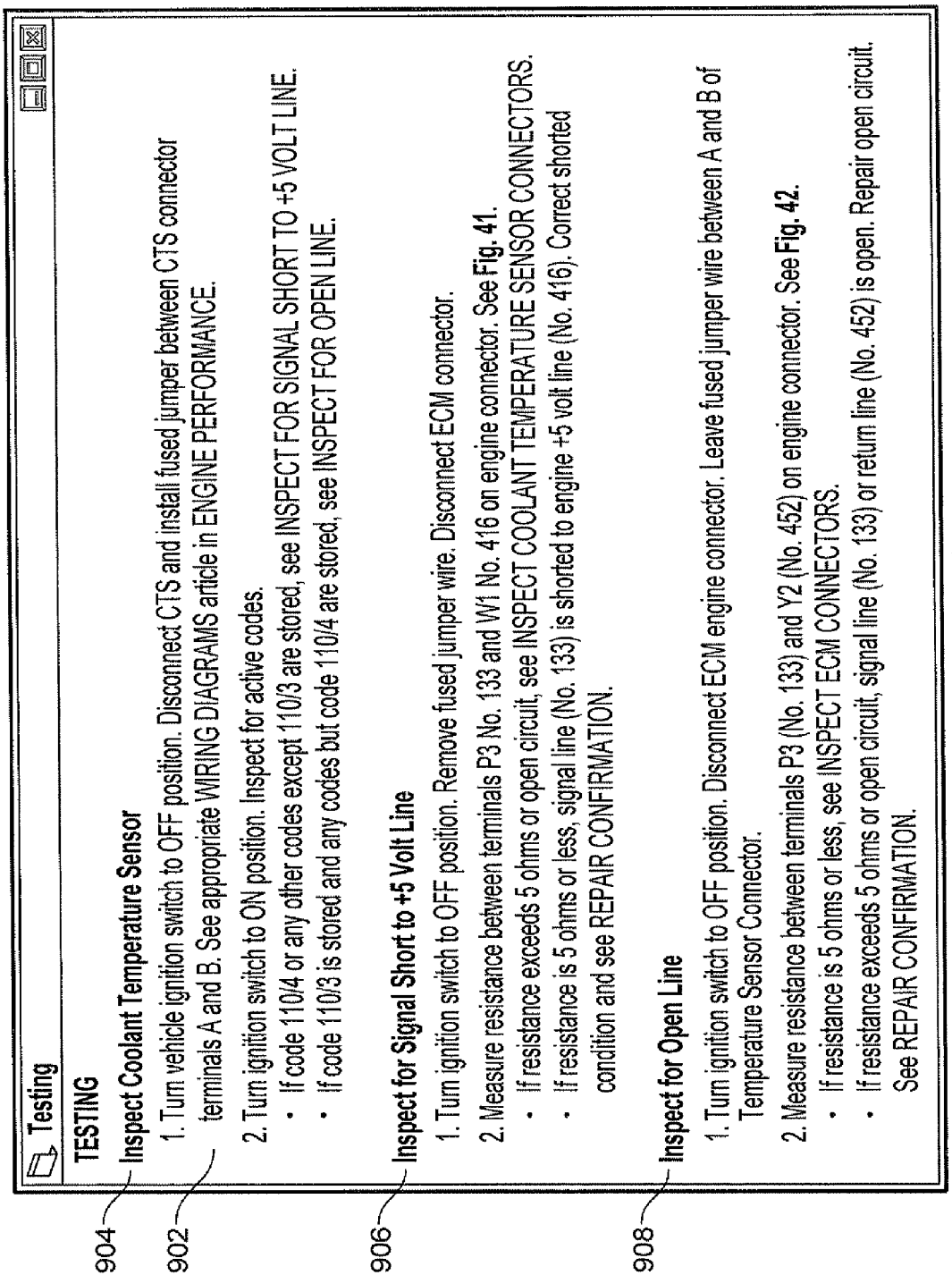
FIG. 12 is an example of a display of Testing Steps tagged diagnosis information displayed to a repair technician.

An example of a display of a Testing Steps is set forth in FIG. 12. As shown in this figure, the Testing Steps display sets forth an interlinked diagnostic tree 902 for conducting further testing to determine the culprit behind the trouble code entered by the repair technician. The diagnostic tree has interrelated steps 904, 906, 908 that include specific instructions and/or indicate equipment to be used by technicians for diagnosing vehicle problems, for example. The result of one test may infer that the problem lies in another area. For example, in the "Inspect Coolant Temperature Sensor" step 904, the result of sub-step '2' may indicate that the repair technician should begin the "Inspect For Signal Short to +5 Volt Line" step 906, or the "Inspect for Open Line" step 908. The Testing Steps display of FIG. 12 is exemplary in nature, and alternatively, a progression of question and answer windows, for example, could be used instead.

Figure 13:
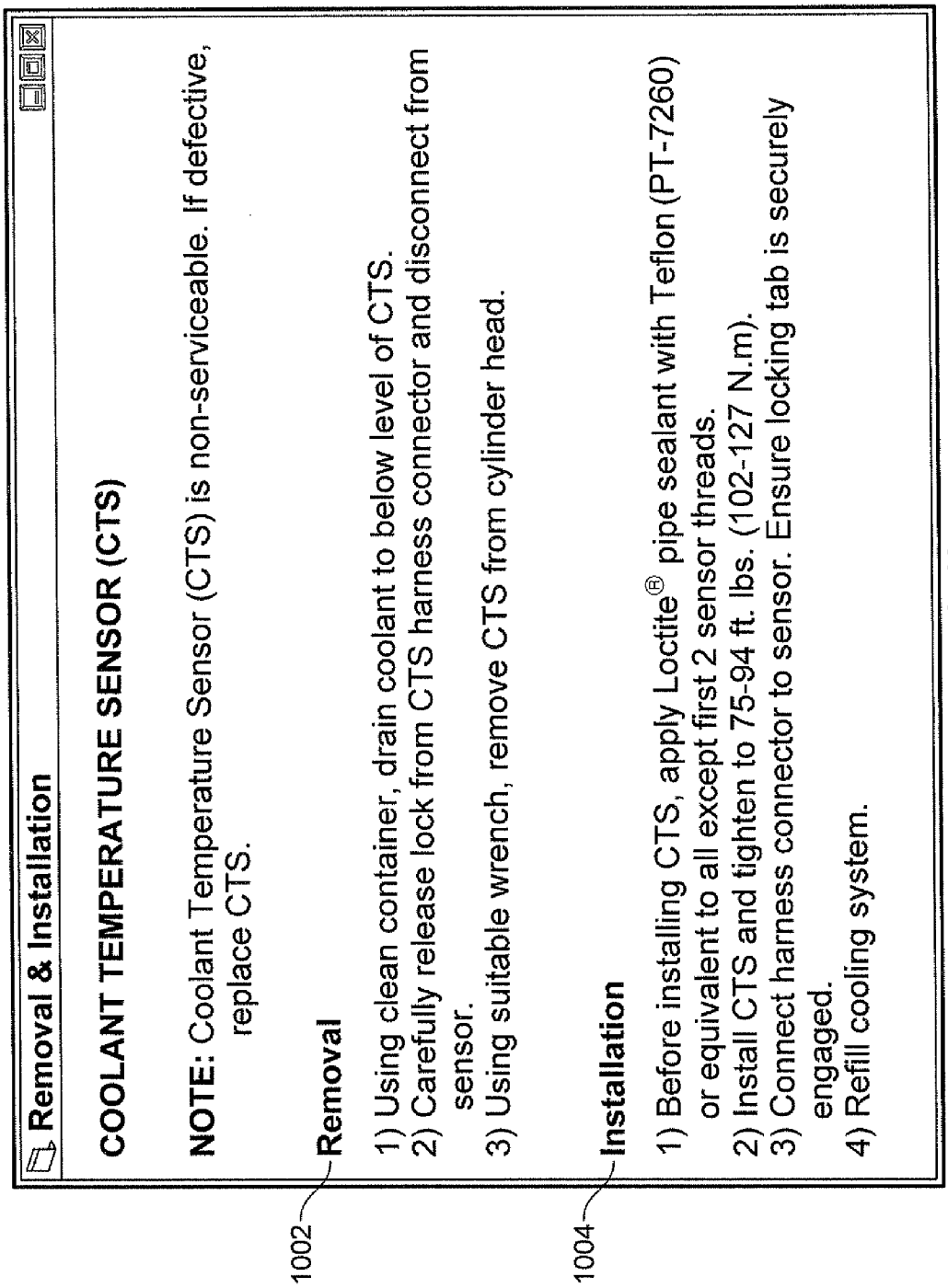
FIG. 13 is an example of a display of Removal & Installation tagged diagnosis information displayed to a repair technician.

An example of a display of a Removal and Installation is set forth in FIG. 13. As shown in this figure, the Removal and Installation display sets forth Removal Steps 1002 for removing an old part and Installation Steps 1004 for installing the new part.

An example of a display of a Specification is set forth in FIG. 14. As shown in this figure, the Specification display sets forth the particular device specifications of the part to be installed. In this case, the Specifications display provides electrical supply voltage specifications 1104, sealant specifications 1106 for choosing a proper sealant, and torque specifications 1108 setting forth maximum torque to be used when installing the part.

While each of the displays noted above included a definite structure and flow, any other structure or flow could be used and still fall within the bounds of the current invention.

Utilizing the disclosed diagnostic tool 100, a repair technician can retrieve all relevant diagnostic and repair information corresponding to received trouble codes 300 from a vehicle under diagnosis 104 in a short period of time and display the information on a diagnostic tool 100 in index form. By providing tagged repair information data 202, 212, 220 at the diagnostic information portal 114, a diagnostic tool can retrieve all relevant repair information quickly and at one time, storing the information locally and allowing for a quicker diagnosis and repair of the vehicle under test 104. As a result, repair stations can become more efficient, increasing turn-around times and potentially increasing profits for both the repair technician and the owner of the vehicle under test. Additionally, in the event the diagnostic information portal 114 becomes unavailable, a local stored copy of the repair information can prevent the loss of further downtime in repairing the vehicle under test 104 because of a lack of access to diagnostic repair information. Finally, by tagging diagnostic repair information 202, 212, 220 based on trouble codes 300 received from a vehicle under test 104, the load on the diagnostic information portal 114 can be substantially decreased, as only relevant information is provided to the diagnostic tool 100, and no irrelevant data is required to be served by the diagnostic information portal 114 while the repair technician finds the answer he or she is looking for.

Note that while examples have been described in conjunction with present embodiments of the application, persons of skill in the art will appreciate that variations may be made without departure from the scope and spirit of the application. For example, the apparatus and methods described herein may be implemented in hardware, software, or a combination thereof, such as a general purpose or dedicated processor running a software application through volatile or non-volatile memory in order to transform the general purpose computer or dedicated processor into a unique special purpose processor. Additionally, while the examples have focused on automotive applications, the apparatus and methods described herein can be equally applied to any electrical mechanical device that stores trouble codes relative to underlying malfunctions. The true scope and spirit of the application is defined by the appended claims, which may be interpreted in light of the foregoing.

What is claimed is:

1. A method for retrieving diagnostic information, the method comprising:
    storing, at a diagnostic information portal, an electronic library of diagnostic information, wherein the diagnostic information comprises an article tagged with an article identifier (ID) and the diagnostic information comprises a plurality of information objects tagged with a respective object ID, wherein the article ID is associated with diagnosable equipment from which a diagnostic trouble code relative to a past or current error condition of the diagnosable equipment can be retrieved, and wherein each of the tagged information objects corresponds to a diagnostic trouble code that can be retrieved from the diagnosable equipment;
    receiving, at the diagnostic information portal, an equipment identifier of the diagnosable equipment and information identifying a diagnostic trouble code retrieved from the diagnosable equipment;
    cross-referencing, via the diagnostic information portal, the received equipment identifier and the received information identifying the diagnostic trouble code to determine the article ID that is associated with the diagnosable equipment and to determine the object IDs of a plurality of information objects that correspond to the diagnostic trouble code identified by the information identifying the diagnostic trouble code retrieved from the diagnosable equipment;
    retrieving, via the diagnostic information portal from the electronic library, the plurality of information objects that correspond to the diagnostic. trouble code identified by the information identifying the diagnostic trouble code retrieved from the diagnosable equipment, wherein the retrieved information objects comprise for diagnosing the diagnostic trouble code; and
    transmitting, from the diagnostic information portal to a diagnostic tool via the communication link, the plurality of retrieved information objects that correspond to the diagnostic trouble code identified by the information identifying the diagnostic trouble code retrieved from the diagnosable equipment.

2. The method of claim 1. further comprising:
    displaying an index to the plurality of retrieved information objects on a display screen of the diagnostic tool that retrieved the diagnostic trouble code from the diagnosable equipment.

3. The method of claim 1,
    wherein the electronic library is stored in a first electronic storage medium and is accessible via the Internet;
    wherein the diagnostic tool (i) receives the retrieved diagnostic trouble code from a second electronic storage medium, and (ii) requests, from the electronic library via the Internet, diagnostic information for the retrieved diagnostic trouble code and the diagnosable equipment, wherein the second electronic storage medium is contained within the diagnosable equipment; and
    wherein the diagnostic tool receives the plurality of retrieved information objects transmitted via the communication link and stores the received information objects in a third electronic storage medium contained within the diagnostic tool.

4. The method of claim 3, wherein the diagnostic tool also retrieves year, make, and model information or unique equipment identification number (EIN) information from the second electronic Storage medium within the diagnosable equipment, and sends the year, make, and model information Or EN information along with the retrieved diagnostic trouble code to the electronic library.

5. The method of claim 1,
    wherein the diagnosable equipment is a motor vehicle or a portion of the motor vehicle, and
    wherein the tagged information objects comprise diagnostic information regarding the motor vehicle.

6. The method of claim 1,
    wherein receiving an equipment identifier of the diagnosable equipment and information identifying the diagnostic trouble code retrieved from the diagnosable equipment comprises the diagnostic information portal.

receiving via the communication link a request comprising the equipment identifier and the information identifying the diagnostic trouble code, and wherein the diagnostic tool connected to the diagnosable equipment generates the request and then transmits the request to the diagnostic information portal via the communication link.

7. The method of claim 1, further comprising:

prior to the diagnostic information portal retrieving the information objects from the electronic library, the diagnostic information portal receiving, from a diagnostic tool that retrieved the diagnostic trouble code, (i) the article ID that is associated with the diagnosable equipment, and (ii) the object ID that corresponds to the diagnostic trouble code retrieved from the diagnosable equipment.

8. The method of claim 1, wherein the article ID and the object ID tagged to each retrieved information object is a respective alpha-numeric character string.

9. The method of claim 1, wherein tagging of the tagged information objects is based on a Standard General Markup Language.

10. The method of claim 1, wherein the article, tagged with the article ID that is associated with the diagnosable equipment, comprises information objects with diagnostic information for all diagnostic trouble codes related to the diagnosable equipment.

11. A system for retrieving diagnostic information, the system comprising:

a processor, within a diagnostic information portal, for processing program instructions;

a data storage device comprising the program instructions and an electronic library of diagnostic information; and a communication device that communicates with a diagnostic tool via a communication link, wherein the diagnostic information comprises an article tagged with an article identifier (ID) and the diagnostic information comprises a plurality of information objects tagged with a respective object ID, wherein the article ID is associated with diagnosable equipment from which a diagnostic trouble code relative to a past or current error condition of the diagnosable equipment can be retrieved, wherein each of the tagged information objects corresponds to a diagnostic trouble code that can be retrieved from the diagnosable equipment, wherein the communication device receives an equipment identifier of the diagnosable equipment and information identifying a diagnostic trouble code retrieved from the diagnosable equipment, wherein the program instructions are executable by the processor to cross-reference the received equipment identifier and the received information identifying the diagnostic trouble code to determine the article ID that is associated with the diagnosable equipment and to determine the object IDs of a plurality of information objects that correspond to the diagnostic trouble code identified by the information identifying the diagnostic trouble code retrieved from the diagnosable equipment, wherein the program instructions are executable by the processor to retrieve, from the electronic library, the plurality of information objects that correspond to the diagnostic trouble code identified by the information identifying the diagnostic trouble code retrieved from the diagnosable equipment and to cause the plurality of retrieved information objects to be transmitted away from the diagnostic information portal via the communication link, wherein the retrieved information objects comprise testing steps for diagnosing the diagnostic trouble code, and wherein each of the retrieved information objects is tagged with a respective object ID that (i) is located within the article tagged with the article ID that is associated with the diagnosable equipment, and (ii) corresponds to the diagnostic trouble code retrieved from the diagnosable equipment.

12. The system of claim 11, wherein the diagnosable equipment is a motor vehicle or a portion of the motor vehicle, and the tagged information objects comprise diagnostic information regarding the motor vehicle, 13. The system of claim 12, wherein the portion of the motor vehicle comprises an engine control module contained within the motor vehicle.

14. The system of claim 11, further comprising:

the diagnostic tool, wherein the diagnostic tool retrieves, from the diagnosable equipment, (i) diagnostic trouble codes, and (ii) year, make, and model information regarding the diagnosable equipment or unique equipment identification number (EIN) information.

15. The system of claim 14, wherein the communication link comprises a wired link, a wireless link, or a combination thereof.

16. The system of claim 14, wherein the diagnostic tool comprises a display to display the retrieved information objects transmitted away from the diagnostic information portal via the communication link after the information objects are received at the diagnostic tool via the communication link.

17. The system of claim 11, wherein the program instructions are executable by the processor to retrieve at least one other information object from the electronic library and to cause the at least one other information object, retrieved from the electronic library, to be transmitted away from the diagnostic information portal via the communication link, and wherein each information object of the at least one other information object is tagged with an object ID that (i) is located within the article tagged with the article ID that is associated with the diagnosable equipment, and (ii) corresponds to the diagnostic trouble code retrieved from the diagnosable equipment.

18. The method of claim 1, further comprising:

the diagnostic information portal retrieving at least one other information object from the electronic library, wherein each information object of the at least one other information object is tagged with an object ID that (i) is located within the article tagged with the article ID that is associated with the diagnosable equipment, and (ii) corresponds to the diagnostic trouble code retrieved from the diagnosable equipment.

19. The method of claim 18, further comprising:

displaying an index to the retrieved information objects and the at least one other information object on a display screen of the diagnostic tool.

20. The method of claim 18, further comprising:

the diagnostic information portal receiving a request for diagnostic information, wherein retrieving the plurality of information objects and retrieving the at least one other information object are both carried out in response to the diagnostic information portal receiving the request for diagnostic information.

21. The method of claim 2, wherein the retrieved plurality of information objects further comprises one or more of the following information objects: (i) a wiring diagram related to the diagnostic trouble code, (ii) a graphical connector view of a connector related to the diagnostic trouble code, (iii) graphical component locator view that illustrates where a component is located, (iv) instructions for removing and installing a component in diagnosing the diagnostic trouble code, and (v) specification data for a component being diagnosed in regard to the diagnostic trouble code.

22. The system of claim 12, wherein the retrieved plurality of information objects further comprises one or more of the following information objects: (i) a wiring diagram related to the diagnostic trouble code, (ii) a graphical connector view of a connector related to the diagnostic trouble code, (iii) a graphical component locator view that illustrates where a component is located, (iv) instructions for removing and installing a component in diagnosing the diagnostic trouble code, and (v) specification data for a component being diagnosed in regard to the diagnostic trouble code.

23. The method of claim 21, wherein the retrieved plurality of information objects comprises a text description of the diagnostic trouble code.

24. The system of claim 22, wherein the retrieved plurality of information objects comprises a text description of the diagnostic trouble code.

25. The method of claim 1, wherein the retrieved plurality of information objects further comprises one or more of the following information objects: (i) a wiring diagram related to the diagnostic trouble code, (ii) a graphical connector view of a connector related to the diagnostic trouble code, (iii) a graphical component locator view that illustrates where a component is located, (iv) instructions for removing and installing a component in diagnosing the diagnostic trouble code, (v) specification data for a component being diagnosed in regard to the diagnostic trouble code, and (vi) a text description of the diagnostic trouble code.

26. The method of claim 5, wherein the retrieved plurality of being diagnosed in regard to the diagnostic trouble code, and (vi) a text description of the diagnostic trouble code.

27. The method of claim 23, wherein the text description of the diagnostic trouble code comprises one or more of the following descriptors: (i) a parameter identifier (PID) descriptor of the diagnostic trouble code, (ii) a failure mode identifier associated with the diagnostic trouble code, and (iii) a text summary that describes a reason the diagnostic trouble code is set as a current error condition.

28. The method of claim 27,
wherein the text description comprises the text summary that describes the reason the diagnostic trouble code sets as a current error condition, and
wherein the described reason includes most common reasons for the diagnostic trouble code to set as a current error condition.

29. The system of claim 24, wherein the text description of the diagnostic trouble code comprises one or more of the following descriptors: (i) a parameter identifier (PID) descriptor of the diagnostic trouble code, (ii) a failure mode identifier associated with the diagnostic trouble code, and (iii) a text summary that describes a reason the diagnostic trouble code is set as a current error condition.

30. The system of claim 29,
wherein the text description comprises the text summary that describes the reason the information objects further comprises one or more of the following information objects: (i) a wiring diagram related to the diagnostic trouble code, (ii) a graphical connector view of a connector related to the diagnostic trouble code, (iii) a graphical component locator view that illustrates where a component is located, (iv) instructions for removing and installing a component in diagnosing the diagnostic trouble code, (v) specification data for a component being diagnosed in regard to the diagnostic trouble code, and (vi) a text description of the diagnostic trouble code.

31. The system of claim 11, wherein the retrieved plurality of information objects further comprises one or more of the following information objects: (i) a wiring diagram related to the diagnostic trouble code, (ii) a graphical connector view of a connector related to the diagnostic trouble code, (iii) a graphical component locator view that illustrates where a component is located, (iv) instructions for removing and installing a component in diagnosing the diagnostic trouble code, (v) specification data for a component being diagnosed in regard to the diagnostic trouble code, and (vi) a text description of the diagnostic trouble code.

32. The system of claim 16, wherein the retrieved plurality of information objects further comprises one or more of the following information objects: (i) a wiring diagram related to the diagnostic trouble code, (ii) a graphical connector view of a connector related to the diagnostic trouble code, (iii) a graphical component locator view that illustrates where a component is located, (iv) instructions for removing and installing a component in diagnosing the diagnostic trouble code, (v) specification data for a component diagnostic trouble code sets as a current error condition, and
wherein the described reason includes most common reasons for the diagnostic trouble code to set as a current error condition.

* * * * *